United States Patent
Lee et al.

(10) Patent No.: US 8,575,794 B2
(45) Date of Patent: Nov. 5, 2013

(54) LINEAR VIBRATION MOTOR HAVING A BUFFER MEMBER

(75) Inventors: Jee Sung Lee, Gyunggi-do (KR); Kwang Hyung Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 311 days.

(21) Appl. No.: 12/805,022

(22) Filed: Jul. 7, 2010

(65) Prior Publication Data

US 2011/0062804 A1 Mar. 17, 2011

(30) Foreign Application Priority Data

Sep. 11, 2009 (KR) .................. 10-2009-0086035

(51) Int. Cl.
*H02K 33/02* (2006.01)
*H02K 35/02* (2006.01)
*H02K 33/00* (2006.01)
*H02K 35/00* (2006.01)

(52) U.S. Cl.
USPC ............................ 310/30; 310/15; 310/12.31

(58) Field of Classification Search
USPC .............. 310/30, 12.16, 12.31, 15–29, 31–39
IPC ........... H02K 33/00,33/02, 33/18, 35/00, 35/02, H02K 7/065
See application file for complete search history.

(56) References Cited

U.S. PATENT DOCUMENTS

| | | | | |
|---|---|---|---|---|
| 2,472,637 | A * | 6/1949 | Weyandt ........................ | 310/29 |
| 4,127,835 | A * | 11/1978 | Knutson ........................ | 310/30 |
| 5,693,991 | A * | 12/1997 | Hiterer et al. .................. | 310/30 |
| 7,619,498 | B2 * | 11/2009 | Miura .............................. | 310/30 |
| 8,299,658 | B2 * | 10/2012 | Choi et al. ..................... | 310/15 |
| 8,384,259 | B2 * | 2/2013 | Choi et al. ..................... | 310/15 |
| 2007/0236088 | A1 * | 10/2007 | Miura .............................. | 310/15 |
| 2011/0018364 | A1 * | 1/2011 | Kim et al. .................. | 310/12.04 |
| 2011/0062804 | A1 * | 3/2011 | Lee et al. ........................ | 310/30 |
| 2011/0068639 | A1 * | 3/2011 | Choi et al. ..................... | 310/25 |
| 2011/0068640 | A1 * | 3/2011 | Choi et al. ..................... | 310/25 |
| 2011/0068641 | A1 * | 3/2011 | Choi et al. ..................... | 310/25 |

FOREIGN PATENT DOCUMENTS

| | | |
|---|---|---|
| KR | 10-2005-0083528 | 8/2005 |
| KR | 10-2007-0103174 | 10/2007 |

OTHER PUBLICATIONS

Korean Office Action issued on Jan. 13, 2011 in corresponding Korean Patent Application 10-2009-0086035.
Chinese Office Action issued Sep. 13, 2012 in corresponding Chinese Patent Application No. 201010226665.6.

* cited by examiner

*Primary Examiner* — Burton Mullins
*Assistant Examiner* — Michael Andrews

(57) ABSTRACT

A linear vibration motor includes: a top cover; a bracket coupled with the top cover to provide an internal space; a vibration unit having a mass body mounted at the internal space and linearly moving in a horizontal direction; an actuator having a magnet fixed to the mass body and a coil installed within a range of a magnetic field of the magnet and generating electromagnetic force to allow the vibration unit to move linearly in a horizontal direction; and a buffer member disposed in a space between the mass body and the bracket and limiting displacement of the vibration unit.

9 Claims, 6 Drawing Sheets

LINEAR VIBRATION MOTOR HAVING A BUFFER MEMBER

CROSS-REFERENCE TO RELATED APPLICATIONS

This application claims the priority of Korean Patent Application No. 10-2009-0086035 filed on Sep. 11, 2009, in the Korean Intellectual Property Office, the disclosure of which is incorporated herein by reference.

BACKGROUND OF THE INVENTION

1. Field of the Invention

The present invention relates to a linear vibration motor and, more particularly, to a linear vibration motor for vibrating a mass body in a horizontal direction within a mobile terminal and having a buffer member for the mass body.

2. Description of the Related Art

A vibration motor is a component for converting electric energy into mechanical vibrations by using the principle of the generation of electromagnetic force. The vibration motor, tending to become smaller and lighter, is employed in a mobile terminal to provide a mute (or silent) incoming call notification function or various vibration functions.

In particular, as mobile terminals have been reduced in size and have improved in quality, the use of a touch screen type LCD has been favored, requiring a function of generating vibrations when a touch is applied to the touch screen, so the improvement of the vibration motor has gradually taken place.

Recently, in order to implement a vibration function in touch screen phones, touch screen phones have employed a linear vibration motor. The linear vibration motor, rather than being based on the principle that a motor rotates, is excited by an electromagnetic force having a resonance frequency determined by using a spring installed within the linear vibration motor and a mass body hanging on the spring, to thereby generate vibrations.

Here, the electromagnetic force is generated by an interaction of a magnet positioned alongside the mass body in motion and a coil providing current of a certain frequency at a position corresponding to the magnet.

The linear vibration motor is configured to generate vibrations in a direction perpendicular to the LCD screen. However, in the case of vertical vibrations, a vertical displacement must be secured for the mass body to move to generate vibrations, resulting in a restriction in the thickness of the terminal.

Also, the reduction in the thickness of the terminal causes a problem in that the amount of vibrations produced by the vibration motor cannot be increased.

SUMMARY OF THE INVENTION

An aspect of the present invention provides a linear vibration motor in which an internal mass body moves linearly in a horizontal direction and a buffer member is installed to support the horizontal, linear movement of the mass body and buffers the mass body.

According to an aspect of the present invention, there is provided a linear vibration motor including: a top cover; a bracket coupled with the top cover to provide an internal space; a vibration unit having a mass body mounted at the internal space and linearly moving in a horizontal direction; an actuator having a magnet fixed to the mass body and a coil installed within a range of a magnetic field of the magnet and generating electromagnetic force to allow the vibration unit to move linearly in a horizontal direction; and a buffer member disposed in a space between the mass body and the bracket and limiting displacement of the vibration unit.

The buffer member may be fixed to a coupling protrusion protruded from the mass body.

The buffer member may be fixed to a coupling protrusion protruded from the bracket.

The coupling protrusion may be thread-coupled with the buffer member.

The buffer member may be disposed at one side of the mass body, and an elastic member may be provided to the other side of the mass body in order to elastically support the vibration unit.

The elastic member may be a coil spring, a torsion spring, or a leaf spring.

The buffer member may be elastic rubber.

The linear vibration motor may further include: a fixed shaft extending from one side of the bracket or the mass body; and a buffer member support extending such that the buffer member is perpendicular to the fixed shaft, wherein an annular buffer member may be inserted into the buffer member support.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
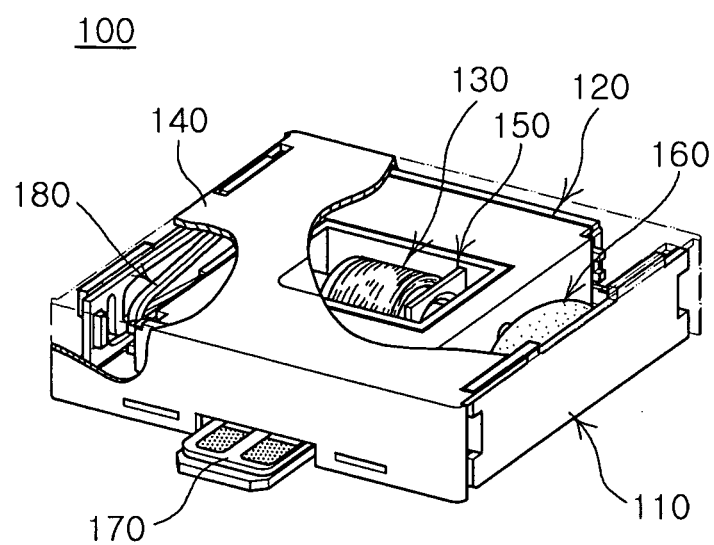
FIG. 1 is a partially cut-away perspective view of a linear vibration motor according to an exemplary embodiment of the present invention.

Exemplary embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions may be exaggerated for clarity, and the same reference numerals will be used throughout to designate the same or like components.

Figure 2:
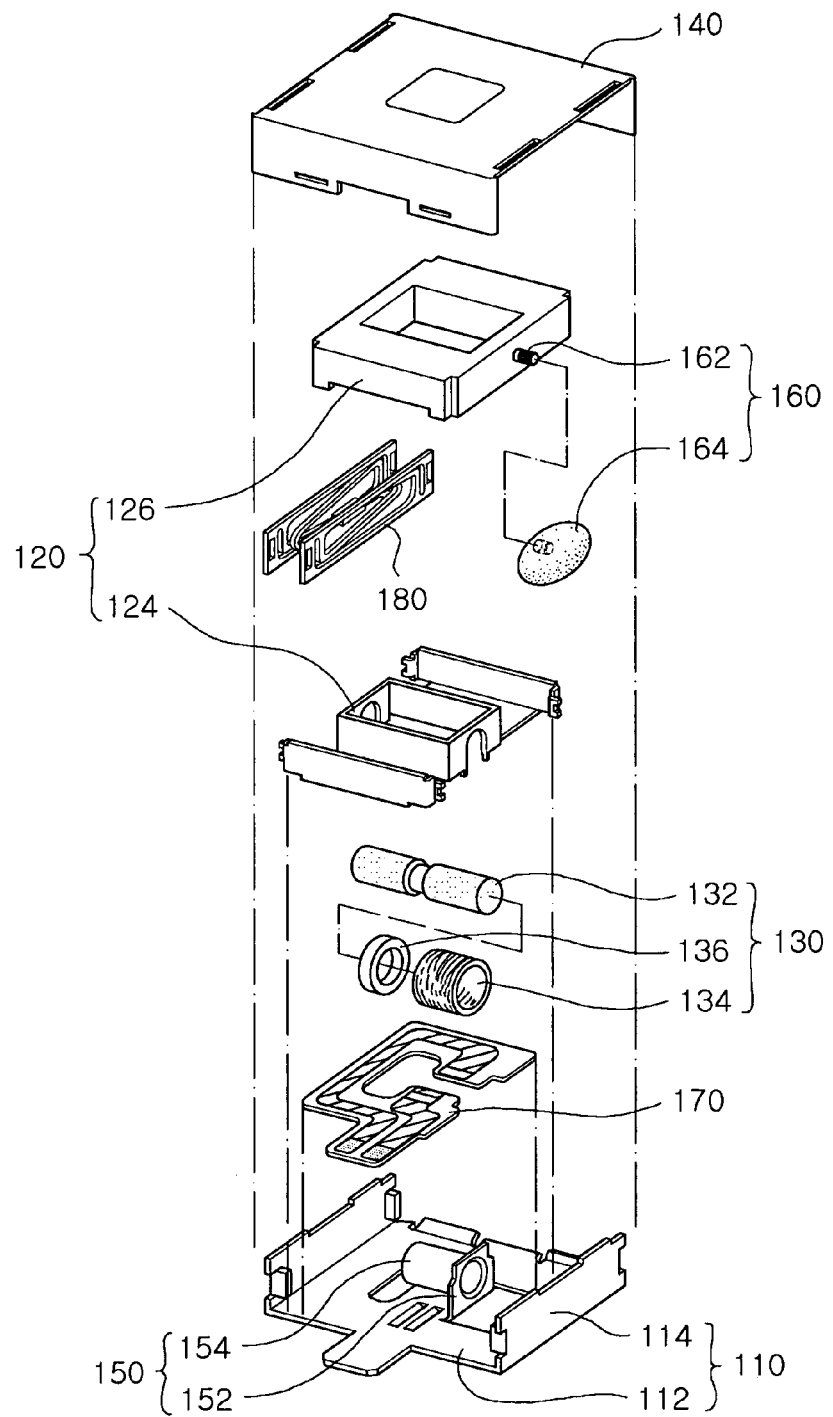
FIG. 2 is an exploded perspective view of the linear vibration motor according to an exemplary embodiment of the present invention.

FIG. 1 is a partially cut-away perspective view of a linear vibration motor according to an exemplary embodiment of the present invention, and FIG. 2 is an exploded perspective view of the linear vibration motor according to an exemplary embodiment of the present invention.

Figure 3:
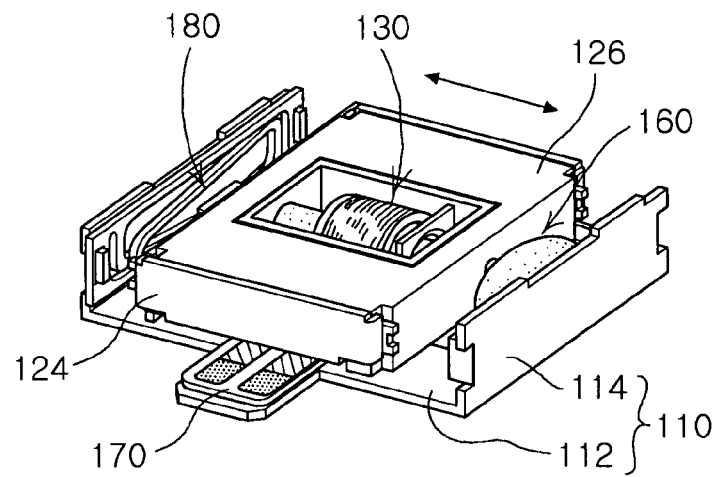
FIG. 3 is a schematic perspective view showing the interior of the linear vibration motor without a top cover according to an exemplary embodiment of the present invention.
Figure 4:
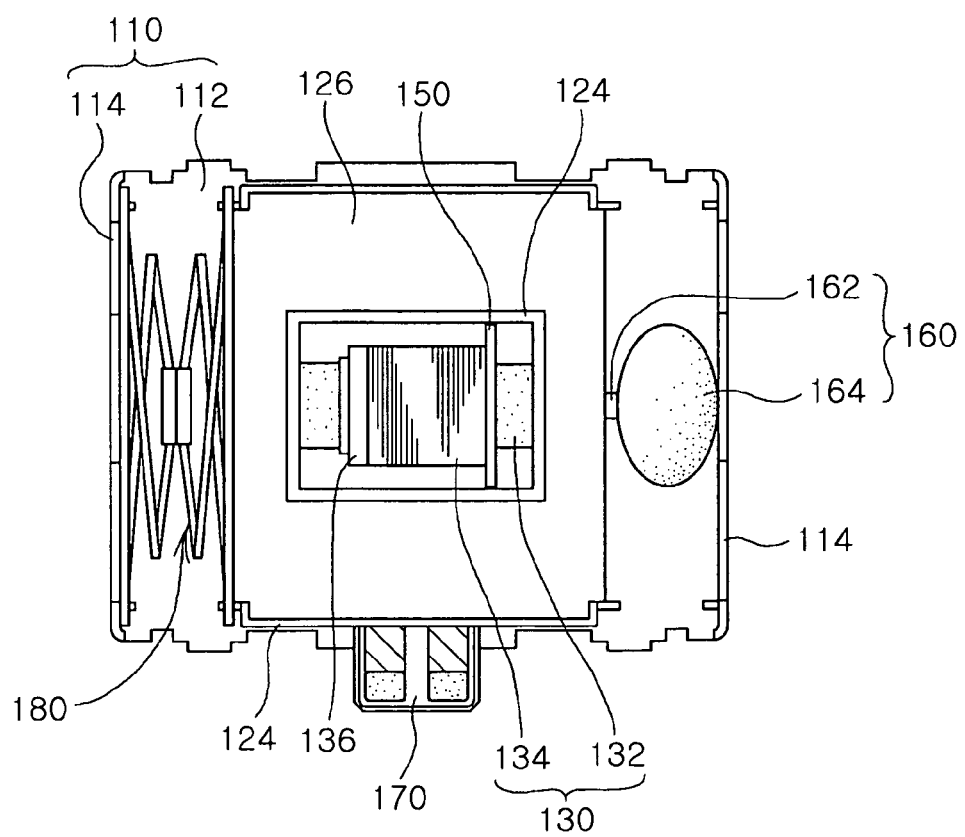
FIG. 4 is a plan view of the linear vibration motor without the top cover according to an exemplary embodiment of the present invention.
Figure 5:
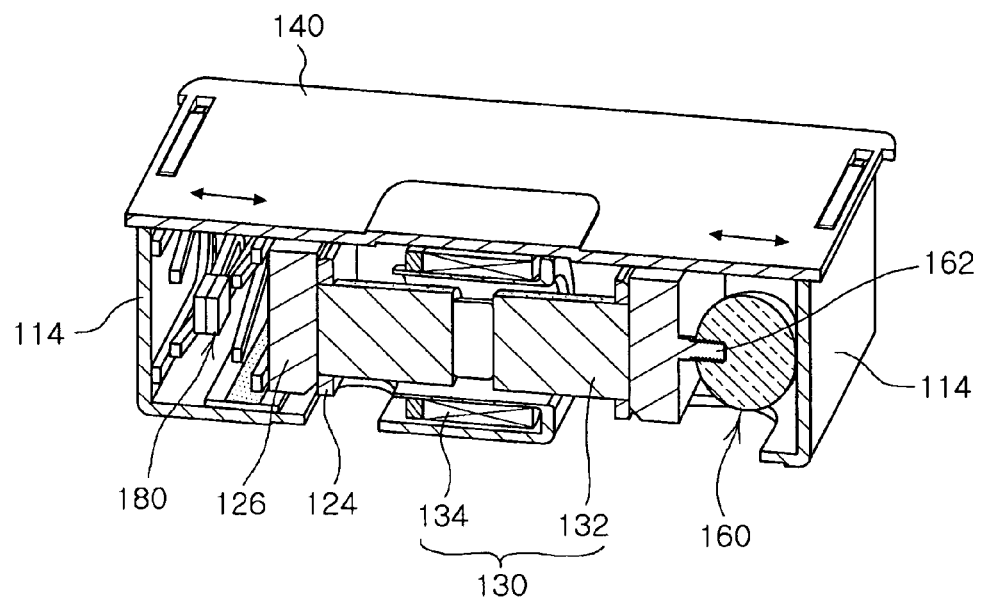
FIG. 5 is a schematic perspective view showing the section of the linear vibration motor according to an exemplary embodiment of the present invention.

FIG. 3 is a schematic perspective view showing the interior of the linear vibration motor without a top cover according to an exemplary embodiment of the present invention, FIG. 4 is a plan view of the linear vibration motor without the top cover according to an exemplary embodiment of the present invention, and FIG. 5 is a schematic perspective view showing the section of the linear vibration motor according to an exemplary embodiment of the present invention.

With reference to FIGS. 1 to 5, a linear vibration motor 100 according to an exemplary embodiment of the present invention may include a top cover 140, a bracket 110, a vibration unit 120, and a buffer member 164.

The bracket 110 is coupled with the top cover 140 to provide an internal space. The bracket 110 has a structure in which an upper portion and a side portion thereof are open such that they correspond to the top cover 140, and includes a bracket lower plate 112 and a support plate 114 in a widthwise direction.

A bobbin 150 is formed at an upper portion of the bracket lower plate 112, and a circuit board 170 may be mounted thereupon.

The support plate 114 is formed to be bent vertically from the bracket lower plate 112, and an elastic member 180 is insertedly fixed to one inner surface of the support plate 114, and a buffer member 164 is provided on the other inner surface of the support plate 114.

The bobbin 150 is positioned at the center of the upper portion of the bracket lower plate 112 and may include a vertical plate part 152 bent to be vertical to the bracket lower plate 112 and a cylindrical part 154 extending from the vertical plate part 152 such that it is horizontal to the bracket lower plate 112.

The support plate part 152 and the cylindrical part 154 may have a hollow portion through which a magnet 132 moves reciprocally.

Here, a cylindrical coil 134 is insertedly fixed on an outer circumferential surface of the bobbin 150, and the bobbin 150 has the cylindrical shape with a hollow portion therein allowing the magnet 132 to make a reciprocal movement therethrough. However, the structure of the bobbin 150 is not limited thereto, and the structure may be omitted.

The circuit board 170 is connected with an external input terminal and transfers power applied thereto to the cylindrical coil 134.

However, the circuit board 170 is not limited to the configuration in which it is formed separately from the bracket 110. Namely, the circuit board 170 and the bracket 110 may be integrally formed according to a designer's intention, and a flexible printed circuit board (FPCB) may be used as the circuit board 170.

The cylindrical coil 134 serves to generate an electric field of a certain strength by interacting with the magnet 132 when power is applied thereto from an external source. The cylindrical coil 134 is inserted onto the outer circumferential surface of the cylindrical part 154 of the bobbin 150. In this case, in fixing the cylindrical coil 134 to the cylindrical part 154, a ring 136 is inserted to fix the cylindrical coil 134 to the cylindrical part 154.

A coil line of the cylindrical coil 134 is connected with a pattern part of the circuit board 170 through soldering, whereby power can be applied to the cylindrical coil 134 from an external source.

However, the coil part is not limited to the cylindrical shape. Namely, a rectangular coil may be disposed on the upper surface of the bracket 110, or a plate may be formed and disposed thereon.

The vibration unit 120 includes a mass body 126 mounted at the internal space of the bracket 110 and makes a horizontal linear movement due to an electromagnetic force of an actuating unit 130. The mass body 126 may be mounted on a yoke part 124 which accommodates the cylindrical coil 134 and the magnet 132 therein.

The yoke part 124 configures a magnetic closed circuit by smoothly forming magnetic flux of the magnet 132 and may have internal space for accommodating the cylindrical coil 134 and the magnet 132 therein.

Both end portions of the yoke part 124 may be bent upward so as to be positioned perpendicular to the bracket lower pate 112, and may extend to tightly attach on outer surfaces of the mass body 126.

The mass body 126 serves to give a certain mass to the vibration unit 120 for linear vibrations, including an accommodation space for accommodating a central portion of the yoke part 124 therein.

Preferably, the mass body 126, having a mass of a certain size, vibrates in a vibrational direction according to an interaction of the magnet 132 and the cylindrical coil 134. Here, the vibrational direction refers to a direction horizontal to the cylindrical coil 134.

The elastic member 180 elastically supports the vibration unit 120 such that the vibration unit 120 linearly moves horizontally. In a state that the elastic member 180 is fixed to the widthwise-directional support plate 114 of the bracket 110, the other side thereof is fixed to the vibration unit 120, thus elastically supporting the vibration unit 120.

Here, the elastic member 180 may be a coil spring, a torsion spring, or a leaf spring.

Here, the elastic member 180 is disposed at one side of the vibration unit 120, and the buffer member 164 is disposed at the other side of the vibration unit 120. Specifically, the buffer member 164 is disposed in the space between the other side of the vibration unit 120 and the bracket 110 to limit the displacement of the vibration unit 120.

Besides elastically supporting the vibration unit, the buffer member 164 may limit horizontal displacement. The buffer member 164 may be elastic rubber that absorbs an impact generated according to horizontal vibrations of the vibration unit 120.

The buffer member 164 will now be described in detail.

Figure 6:
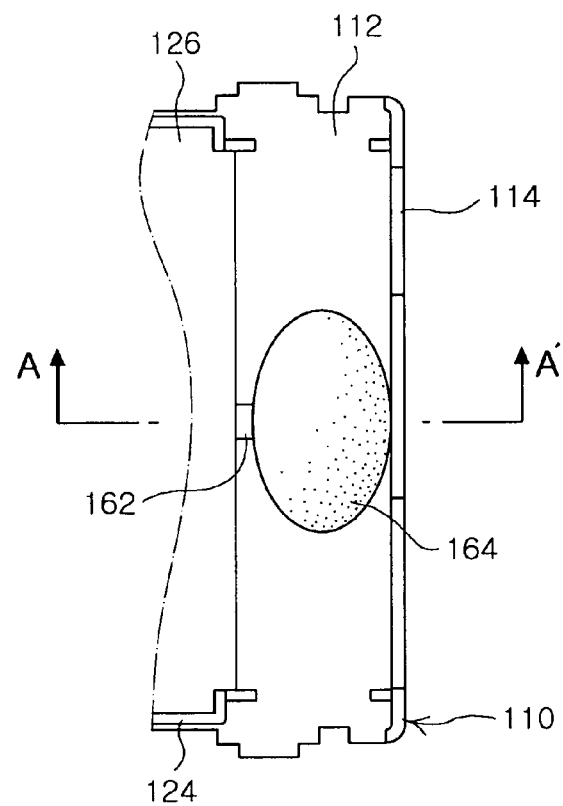
FIG. 6 is a schematic view showing a connection state of a buffer member of the linear vibration motor according to an exemplary embodiment of the present invention.
Figure 7:
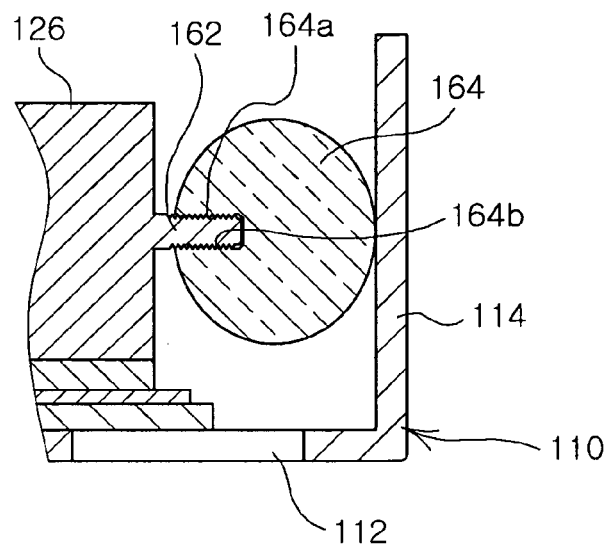
FIG. 7 is a schematic sectional view taken along line A-A of FIG. 6.

FIG. 6 is a schematic view showing a connection state of the buffer member 164 of the linear vibration motor according to an exemplary embodiment of the present invention, and FIG. 7 is a schematic sectional view taken along line A-A of FIG. 6.

With reference to FIGS. 6 and 7, the buffer member 164 may be fixed to a coupling protrusion 162 protruded from the mass body 126. The buffer member 164 has a ball shape and coupled with the coupling protrusion 162.

The coupling protrusion 162 includes a thread 164a formed thereon, and the buffer member 164 includes a thread 165b corresponding to the thread 164a, whereby the mass body 126 and the buffer member 164 can be thread-coupled with each other.

The buffer member 164 may be in contact with the widthwise-directional support plate 114 of the bracket 110 or may be separated with a very small space therebetween.

Figure 8:
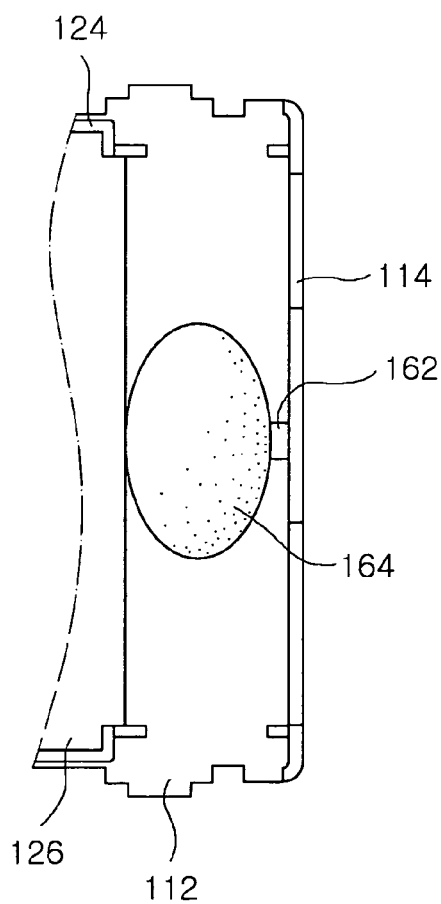
FIG. 8 is a schematic view showing a connection state of a buffer member of the linear vibration motor according to another exemplary embodiment of the present invention.

FIG. 8 is a schematic view showing a connection state of a buffer member 160 of the linear vibration motor according to another exemplary embodiment of the present invention.

With reference to FIG. 8, the buffer member 164 may be fixedly thread-coupled with a coupling protrusion 162 protruded from the bracket 110. For other constituents, the description of those in the exemplary embodiment illustrated with reference to FIGS. 6 and 7 will be applied.

Figure 9:
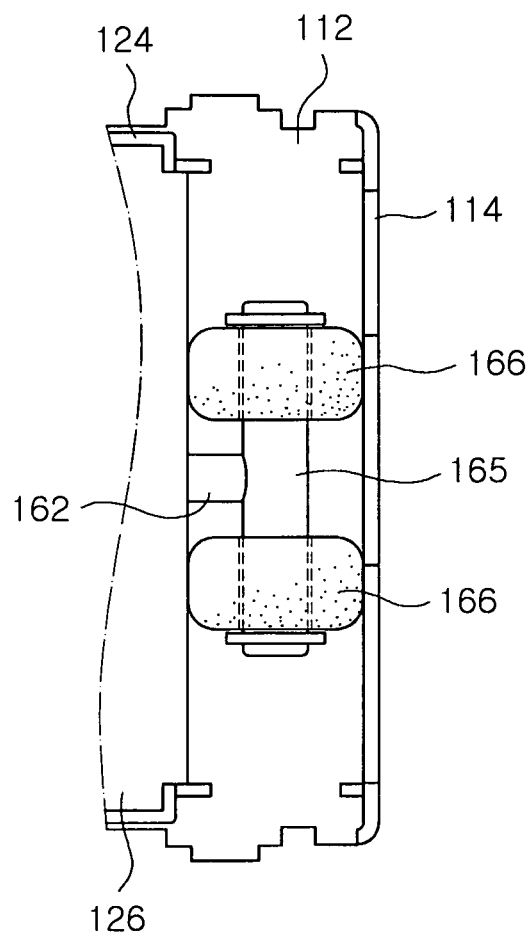
FIG. 9 is a schematic view showing a buffer member of the linear vibration motor according to another exemplary embodiment of the present invention.

FIG. 9 is a schematic view showing a buffer member 166 of the linear vibration motor according to another exemplary embodiment of the present invention.

With reference to FIG. 9, the buffer member 166 has an annular shape, and may be inserted into a buffer member support 165 extending vertically from a fixed shaft 162 extending from one side of the bracket 110 or the mass body 126.

As set forth above, in the linear vibration motor according to exemplary embodiments of the invention, the mass body vibrates in the horizontal direction, the thickness of a terminal is not restricted, and thus, the terminal can be fabricated so as to be slim.

Also, because the buffer member is provided at one side of the mass body, it can absorb an impact with respect to horizontal vibrations of the mass body, lengthening a life span of the linear vibration motor.

While the present invention has been shown and described in connection with the exemplary embodiments, it will be apparent to those skilled in the art that modifications and variations can be made without departing from the spirit and scope of the invention as defined by the appended claims.

What is claimed is:

1. A linear vibration motor comprising:
   a top cover;
   a bracket coupled with the top cover to provide an internal space and including a bobbin having a cylindrical shape;
   a vibration unit having a mass body mounted in the internal space and moving linearly in a horizontal direction;
   an actuator having a coil insertedly fixed to an outer circumferential surface of the bobbin and a magnet fixed to the mass body and inserted into an inside of the bobbin such that both ends of the magnet are exposed outwardly of the coil, and the actuator generating electromagnetic force through interaction with the coil to allow the vibration unit to move linearly in the horizontal direction; and
   a buffer member disposed in a space between the mass body and the bracket and limiting displacement of the vibration unit,
   wherein the mass body includes an accommodation space for accommodating the coil and the magnet therein.

2. The linear vibration motor of claim 1, wherein the buffer member is fixed to a coupling protrusion protruded from the mass body.

3. The linear vibration motor of claim 2, wherein the coupling protrusion is thread-coupled with the buffer member.

4. The linear vibration motor of claim 1, wherein the buffer member is fixed to a coupling protrusion protruded from the bracket.

5. The linear vibration motor of claim 4, wherein the coupling protrusion is thread-coupled with the buffer member.

6. The linear vibration motor of claim 1, wherein the buffer member is disposed at one side of the mass body, and an elastic member is provided to the other side of the mass body in order to elastically support the vibration unit.

7. The linear vibration motor of claim 6, wherein the elastic member is a coil spring, a torsion spring, or a leaf spring.

8. The linear vibration motor of claim 1, wherein the buffer member is elastic rubber.

9. The linear vibration motor of claim 1, further comprising:
   a fixed shaft extending from one side of the bracket or the mass body; and
   a buffer member support extending such that the buffer member is perpendicular to the fixed shaft,
   wherein an annular buffer member is inserted into the buffer member support.

* * * * *